(12) United States Patent
Chae et al.

(10) Patent No.: US 10,039,140 B2
(45) Date of Patent: Jul. 31, 2018

(54) METHOD AND APPARATUS FOR TRANSRECEIVING SIGNAL IN WIRELESS COMMUNICATION SYSTEM

(71) Applicant: LG ELECTRONICS INC., Seoul (KR)

(72) Inventors: Hyukjin Chae, Seoul (KR); Seungmin Lee, Seoul (KR); Hakseong Kim, Seoul (KR); Hanbyul Seo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 4 days.

(21) Appl. No.: 14/904,419

(22) PCT Filed: Jul. 14, 2014

(86) PCT No.: PCT/KR2014/006310
§ 371 (c)(1),
(2) Date: Jan. 11, 2016

(87) PCT Pub. No.: WO2015/005743
PCT Pub. Date: Jan. 15, 2015

(65) Prior Publication Data
US 2016/0157287 A1 Jun. 2, 2016

Related U.S. Application Data

(60) Provisional application No. 61/845,380, filed on Jul. 12, 2013, provisional application No. 61/898,472, filed on Oct. 31, 2013.

(51) Int. Cl.
*H04W 76/02* (2009.01)
*H04L 5/00* (2006.01)
(Continued)

(52) U.S. Cl.
CPC ......... *H04W 76/023* (2013.01); *H04L 5/0023* (2013.01); *H04L 5/0053* (2013.01);
(Continued)

(58) Field of Classification Search
CPC ........ H04B 7/04–7/06; H04W 76/023; H04W 8/005; H04L 27/2613; H04L 5/0023; H04L 5/0053; H04L 5/0092; H04L 5/0048
See application file for complete search history.

(56) References Cited

U.S. PATENT DOCUMENTS

2011/0305179 A1 12/2011 Wang et al.
2012/0039159 A1* 2/2012 Ikeda ................. H04L 27/3444
370/206
(Continued)

FOREIGN PATENT DOCUMENTS

| CN | 102859925 | 1/2013 |
|---|---|---|
| CN | 103891172 | 6/2014 |

(Continued)

OTHER PUBLICATIONS

European Patent Office Application Serial No. 14822153.4, Search Report dated Jan. 3, 2017, 9 pages.

(Continued)

*Primary Examiner* — Andrew Lai
*Assistant Examiner* — Harry H Kim
(74) *Attorney, Agent, or Firm* — Lee Hong Degerman Kang Waimey

(57) ABSTRACT

One embodiment of the present invention relates to a method for device-to-device transreceiving a signal by a first device in a wireless communication system, wherein the method for transreceiving a signal comprises the steps of: receiving from a second device a discovery signal; determining the number of antenna ports associated with the (Continued)

transmission of the discovery signal; and decoding the discovery signal based on the number of antenna ports, wherein an initial value of a sequence constituting the DMRS is determined by a parameter related to a cell ID, and the value of the parameter related to the cell ID is selected from a range of values differing from values available to a physical cell ID and a virtual cell ID.

5 Claims, 8 Drawing Sheets

(51) Int. Cl.
*H04L 27/26* (2006.01)
*H04W 8/00* (2009.01)
*H04W 76/14* (2018.01)

(52) U.S. Cl.
CPC ........ *H04L 5/0092* (2013.01); *H04L 27/2613* (2013.01); *H04W 8/005* (2013.01); *H04W 76/14* (2018.02); *H04L 5/0048* (2013.01)

(56) References Cited

U.S. PATENT DOCUMENTS

| | | | |
|---|---|---|---|
| 2012/0252447 A1* | 10/2012 | Sartori | H04W 48/12 455/434 |
| 2013/0109301 A1 | 5/2013 | Hakola et al. | |
| 2013/0157670 A1 | 6/2013 | Koskela et al. | |
| 2013/0329543 A1* | 12/2013 | Ogawa | H04J 13/18 370/209 |
| 2014/0073356 A1* | 3/2014 | Siomina | G01S 5/0205 455/456.2 |
| 2014/0133395 A1* | 5/2014 | Nam | H04B 7/0452 370/328 |
| 2014/0362758 A1* | 12/2014 | Lee | H04L 5/0037 370/312 |
| 2015/0304994 A1* | 10/2015 | Kim | H04L 5/0048 370/280 |

FOREIGN PATENT DOCUMENTS

| | | |
|---|---|---|
| JP | 2012507974 | 3/2012 |
| JP | 2012231477 | 11/2012 |
| KR | 10-2013-0016379 | 2/2013 |
| WO | 2011130630 | 10/2011 |
| WO | 2012/060934 | 5/2012 |
| WO | 2013/032251 | 3/2013 |

OTHER PUBLICATIONS

Qualcomm Incorporated, "Techniques for D2D Discovery", R1-132503, 3GPP TSG-RAN WG1 #73, May 2013, 7 pages.
3rd Generation Partnership Project (3GPP), "Technical Specification Group Radio Access Network; Evolved Universal Terrestrial Radio Access (E-UTRA); Physical layer procedures (Release 10)," 3GPP TS 36.213 V10.10.0, Jun. 2013, 127 pages.
3rd Generation Partnership Project (3GPP), "Technical Specification Group Radio Access Network; Evolved Universal Terrestrial Radio Access (E-UTRA); Physical Channels and Modulation (Release 11)," 3GPP TS 36.211 V11.3.0, Jun. 2013, 108 pages.
PCT International Application No. PCT/KR2014/006310, Written Opinion of the International Searching Authority dated Nov. 3, 2014, 18 pages.
State Intellectual Property Office of the People's Republic of China Application Serial No. 201480039478.3, Office Action dated Dec. 20, 2017, 17 pages.
ETSI Technical Specification, "LTE; Evolved Universal Terrestrial Radio Access (E-UTRA); Physical channels and modulation (Release 11)," 3GPP TS 36.211 V11.3.0, Jul. 2013, 110 pages.

* cited by examiner

FIG. 5
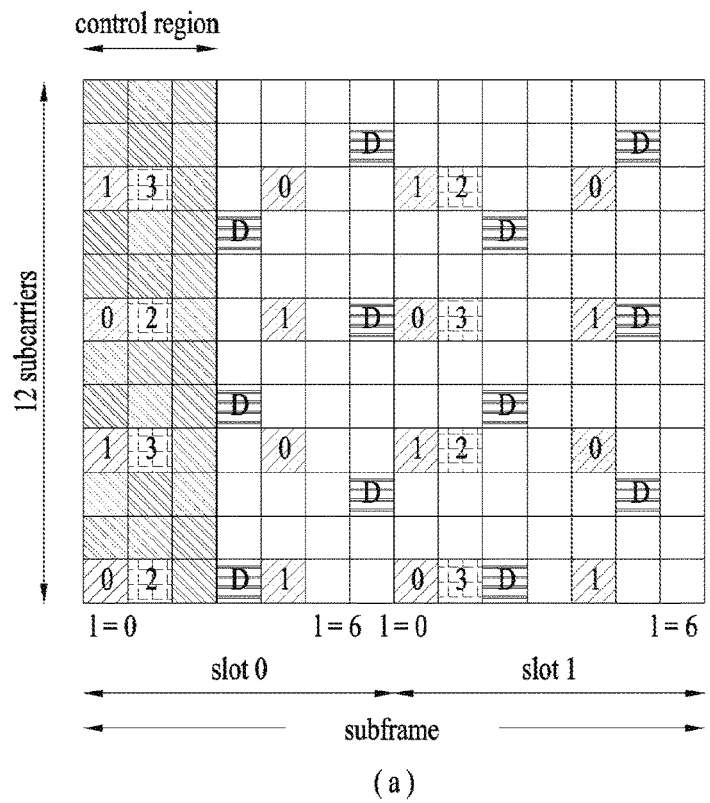
(a)
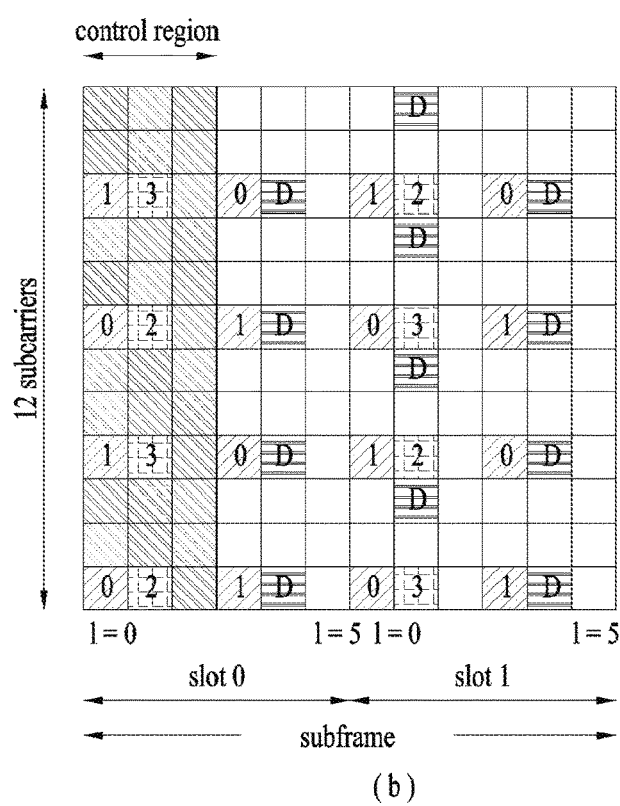
(b)

METHOD AND APPARATUS FOR TRANSRECEIVING SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2014/006310, filed on Jul. 14, 2014, which claims the benefit of U.S. Provisional Application Nos. 61/845,380, filed Jul. 12, 2013, 61/898,472, filed Oct. 31, 2013, the contents of which are all hereby incorporated by reference herein in their entirety.

TECHNICAL FIELD

The present disclosure relates to a wireless communication system and, more particularly, to a method and apparatus for transmitting and receiving a signal in device-to-device communication.

BACKGROUND ART

Wireless communication systems have been widely deployed in order to provide various types of communication services such as voice or data services. Generally, a wireless communication system is a multiple access system capable of supporting communication with multiple users by sharing available system resources (bandwidth, transmit power, etc.). Multiple access systems include, for example, a Code Division Multiple Access (CDMA) system, a Frequency Division Multiple Access (FDMA) system, a Time Division Multiple Access (TDMA) system, an orthogonal frequency division multiple access (OFDMA) system, a Single-Carrier Frequency Division Multiple Access (SC-FDMA) system, and a Multi-Carrier Frequency Division Multiple Access (MC-FDMA) system.

A device-to-device (hereinafter abbreviated D2D) communication corresponds to a communication scheme transmitting and receiving audio, data and the like between UEs without passing through an evolved Node B (hereinafter abbreviated eNB) by configuring a direct link between the UEs. The D2D communication can include such a communication scheme as a UE-to-UE communication scheme, a peer-to-peer communication scheme and the like. The D2D communication scheme can be applied to a M2M (machine-to-machine) communication, MTC (machine type communication) and the like.

The D2D communication is considered as a method of solving a burden of an eNB resulted from increasing data traffic. For instance, unlike a legacy wireless communication system, the D2D communication transmits and receives data between devices without passing through an eNB. Hence, the D2D communication can reduce network overload. Moreover, if the D2D communication is introduced, it may be able to expect reduced procedures of an eNB, reduced power consumption of devices participating in the D2D, increased data transmission speed, increased network capacity, load distribution, and enlarged a cell coverage and the like.

DISCLOSURE

Technical Problem

An object of the present invention devised to solve the problem lies in a method for signaling the number of antenna ports in transmitting a discovery signal in D2D communication.

The technical objects that can be achieved through the present invention are not limited to what has been particularly described hereinabove and other technical objects not described herein will be more clearly understood by persons skilled in the art from the following detailed description.

Technical Solution

The object of the present invention can be achieved by providing a method for transmitting and receiving a device-to-device (D2D) signal by a first device in a wireless communication system, the method including receiving a discovery signal from a second device, determining a number of antenna ports related to transmission of the discovery signal, and decoding the discovery signal based on the number of antenna ports, wherein an initial value of a sequence constituting a Demodulation Reference Signal (DMRS) is determined by a parameter related to a cell ID, wherein a value of the parameter related to the cell ID is selected from a range which is different from a range of a physical cell ID and a range of virtual cell ID.

In another aspect of the present invention, provided herein is a first device for performing device-to-device (D2D) communication in a wireless communication system, the first device including a reception module, and a processor, wherein the processor is configured to receive a discovery signal from a second device, determine a number of antenna ports related to transmission of the discovery signal, and decode the discovery signal based on the number of antenna ports, wherein the number of antenna ports is indicated through one of a sequence shift pattern related to an initial value of a sequence constituting a Demodulation Reference Signal (DMRS) associated with the discovery signal and a predetermined resource region associated with the discovery signal.

The above aspects of the present invention may include some or all of the following details.

The number of antenna ports may be indicated through one of a sequence shift pattern related to the initial value of the sequence constituting the DMRS associated with the discovery signal and a predetermined resource region associated with the discovery signal.

When the number of antenna ports is indicated through the predetermined resource region associated with the discovery signal, a bit sequence mapped to the number of antenna ports may be transmitted through the predetermined resource region.

The predetermined resource region may be adjacent to a resource region for transmission of the DMRS associated with the discovery signal.

Single Input Single Output (SISO) may be constantly used in transmitting the bit sequence.

The parameter related to the cell ID may have the same value in one cluster.

When the number of antenna ports is greater than or equal to 2, the sequence shift pattern may be set to 0.

When the number of antenna ports is greater than or equal to 2, an offset of a preset value may be added to the sequence shift pattern.

When the number of antenna ports is greater than or equal to 2, the first device may assume that the same precoding is used in a unit of a preset number of subframes in receiving the discovery signal.

The first device may assume that frequency hopping is not applied to transmission of the discovery signal.

When frequency hopping is applied to transmission of the discovery signal, the first device may assume that the preset number is 1.

Advantageous Effects

According to embodiments of the present invention, a multi-antenna transmission technique may be used to transmit a discovery signal since a discovery signal receiver is capable of recognizing the number of antenna ports.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIG. 5 illustrates a reference signal.

BEST MODE

Figure 1:
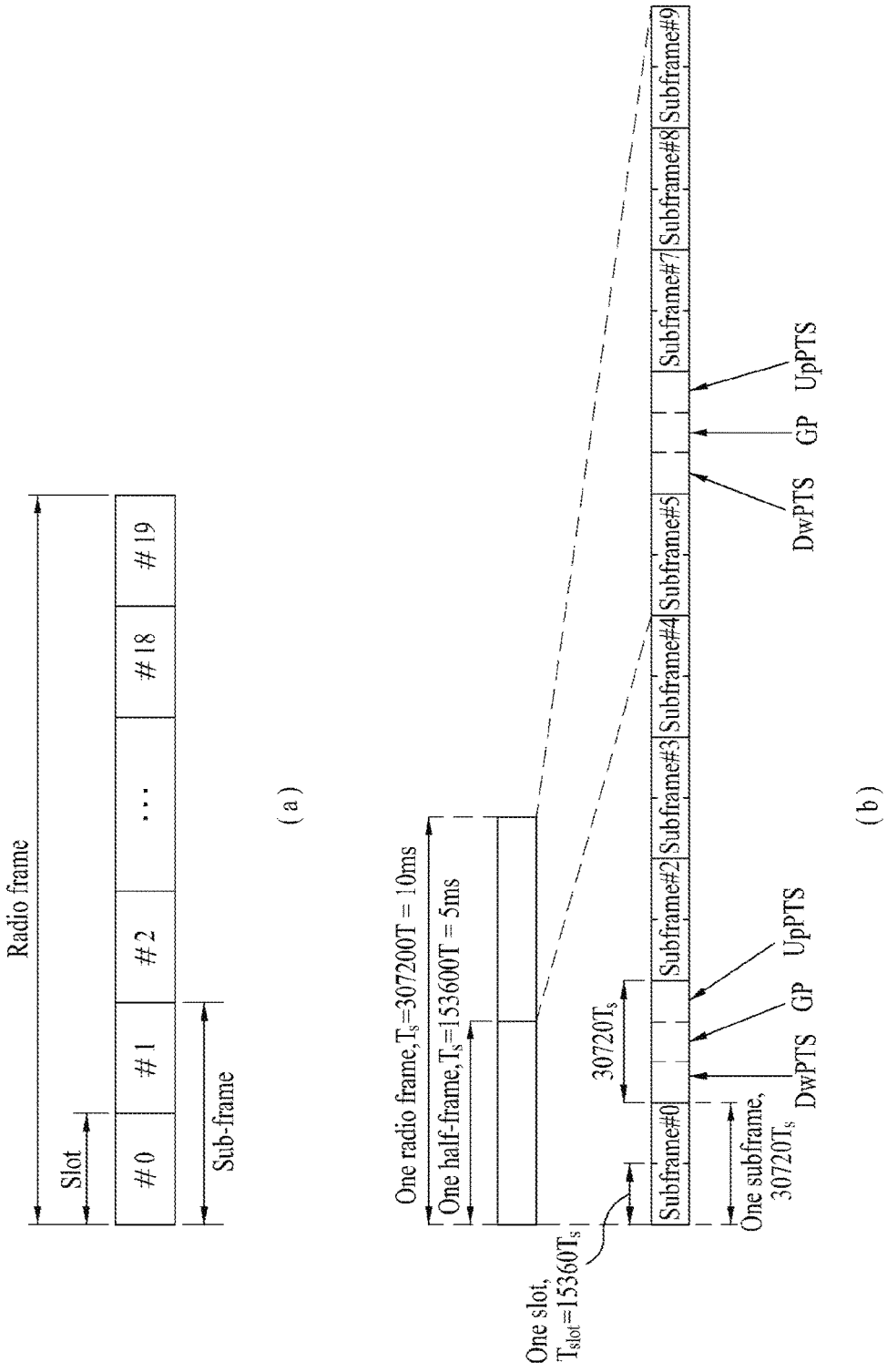
FIG. 1 illustrates the structure of a radio subframe.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
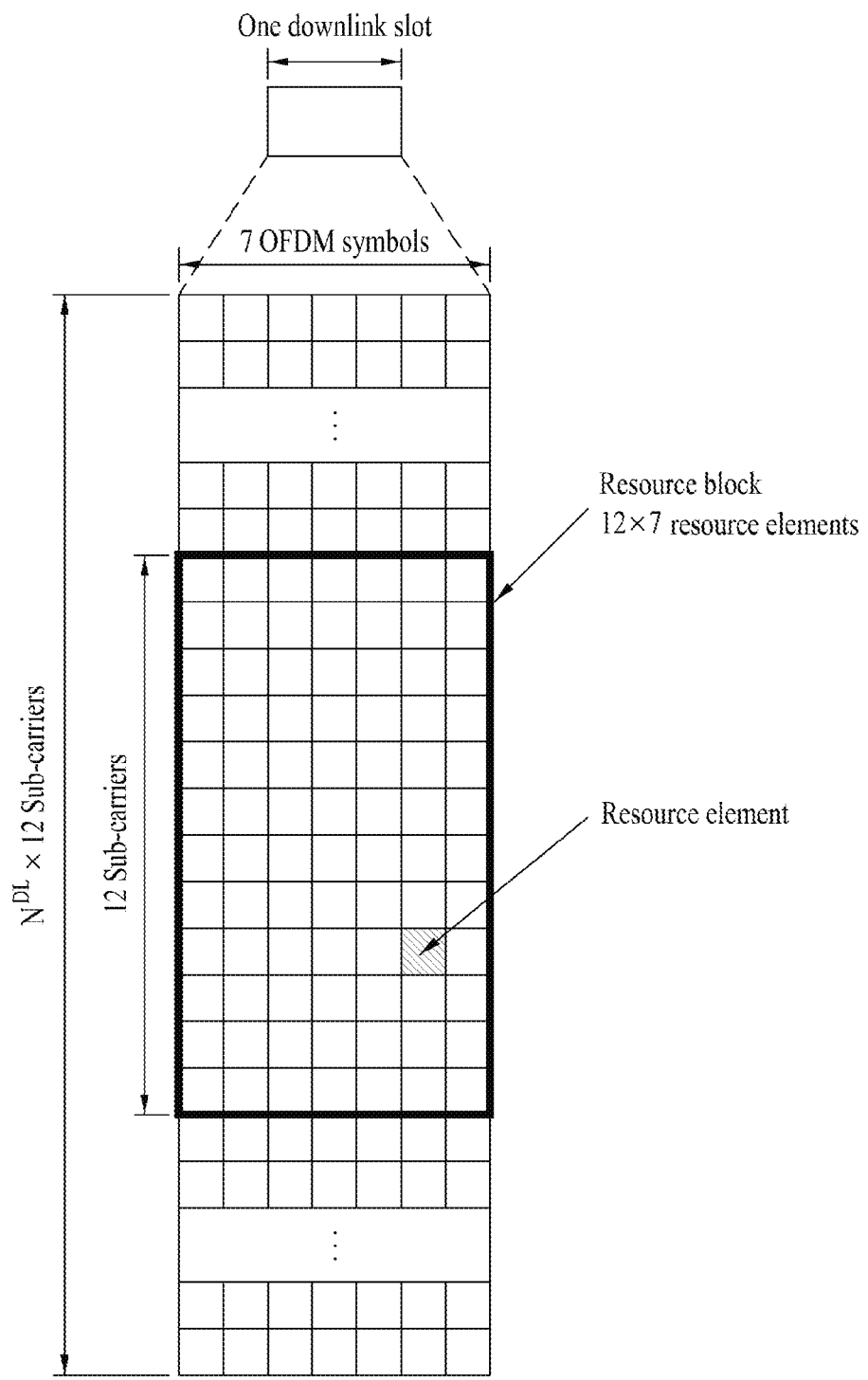
FIG. 2 illustrates a downlink resource grid for a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
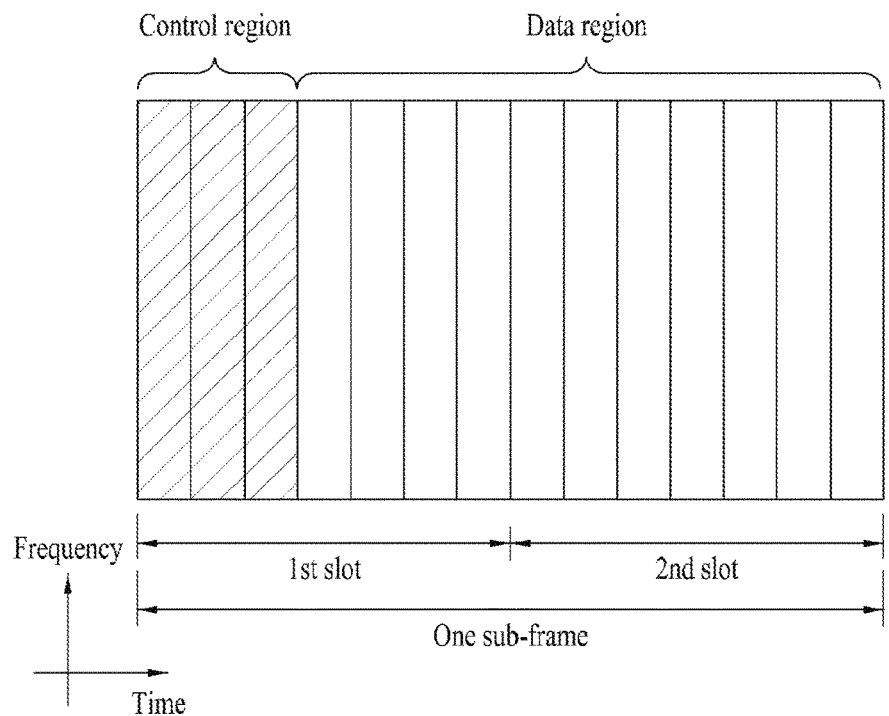
FIG. 3 illustrates the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
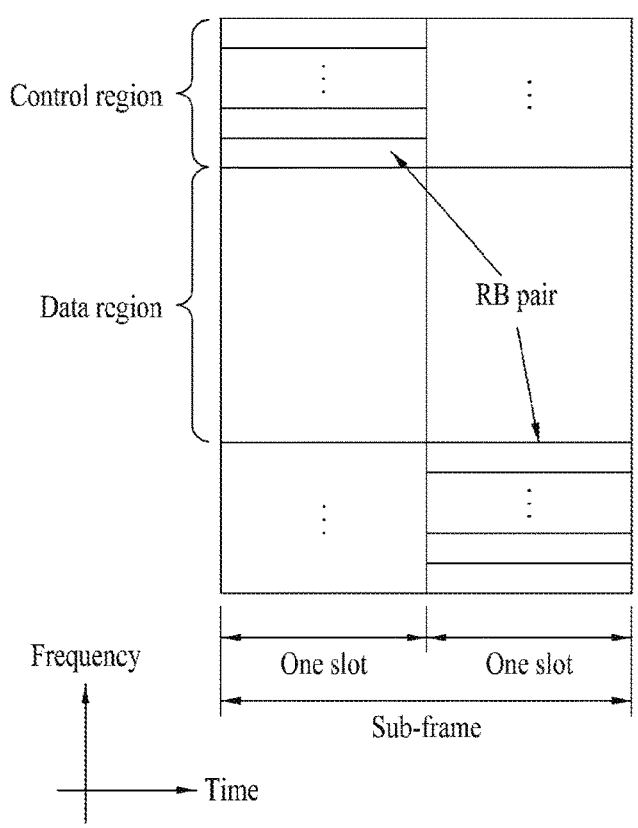
FIG. 4 illustrates the structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

CRSs serve two purposes, that is, channel information acquisition and data demodulation. A UE-specific RS is used only for data demodulation. CRSs are transmitted in every subframe in a broad band and CRSs for up to four antenna ports are transmitted according to the number of Tx antennas in an eNB.

For example, if the eNB has two Tx antennas, CRSs for antenna ports 0 and 1 are transmitted. In the case of four Tx antennas, CRSs for antenna ports 0 to 3 are respectively transmitted.

FIG. 5 illustrates patterns in which CRSs and DRSs are mapped to a downlink RB pair, as defined in a legacy 3GPP LTE system (e.g. conforming to Release-8). An RS mapping unit, i.e. a downlink RB pair may include one subframe in time by 12 subcarriers in frequency. That is, an RB pair includes 14 OFDM symbols in time in the case of the normal CP (see FIG. 5(a)) and 12 OFDM symbols in time in the case of the extended CP (see FIG. 5(b)).

In FIG. 5, the positions of RSs in an RB pair for a system where an eNB supports four Tx antennas are illustrated. Reference numerals 0, 1, 2 and 3 denote the REs of CRSs for first to fourth antenna ports, antenna port 0 to antenna port 3, respectively, and reference character 'D' denotes the positions of DRSs.

Transfer of Antenna Port Information

In D33002D communication, transmission techniques such as multilayer transmission or Space-Time Block Coding (STBC)/Space-Frequency Block Coding (SFBC) may be used in transmitting and receiving, for example, a discovery signal. The antenna port configuration indicating device capability may differ among devices in a cell. Accordingly, signaling of information related to antenna ports of devices may be needed. Herein, the information related to antenna ports may be configuration antenna ports, and refer to the number of physical antennas, the maximum number of layers which are transmittable simultaneously, or the number of parts controllable in a baseband.

In a discovery procedure, it is not possible to know which device will perform communication. For this reason, it may be difficult to pre-signal antenna port configuration. Hereafter, a description will be given of a method for explicitly/implicitly transferring information related to antenna ports in the process of transmission and reception of a discovery signal.

A first device may receive a discovery signal transmitted from a second device, determine information related to antenna ports such as the number of antenna ports through a sequence shift pattern related to an initial value of a sequence constituting a DMRS associated with a discovery signal, and then decode the discovery signal based on the determined information.

More specifically, when it is assumed that the discovery signal is transmitted through PUSCH, the DMRS sequence for the PUSCH is defined as Equation 1.

$$r_{PUSCH}^{(\lambda)}(m \cdot M_{sc}^{RS}+n) = w^{(\lambda)}(m) r_{u,v}^{(\alpha_\lambda)}(n) \qquad \text{Equation 1}$$

In this equation, the DMRS sequence $r_{PUSCH}^{(\lambda)}(\bullet)$ consists of an orthogonal sequence $w^{(\lambda)}(m)$ and a sequence $r_{u,v}^{(\alpha_\lambda)}(0), \ldots, r_{u,v}^{(\alpha_\lambda)}(M_{sc}^{RS}-1)$. $\alpha_\lambda = 2\pi n_{cs,\lambda}/12$ is a cyclic shift (CS). Herein, $n_{cs,\lambda}$ is determined by Equation 2 below.

$$n_{cs,\lambda} = (n_{DMRS}^{(1)} + n_{DMRS,\lambda}^{(2)} + n_{PN}(n_s)) \bmod 12$$

$$n_{PN}(n_s) = \Sigma_{i=0}^{7} c(8N_{symb}^{UL} \cdot n_s + i) \cdot 2^i \qquad \text{Equation 2}$$

Herein, c(i) denotes a pseudo-random sequence, and is initialized with $C_{ini}$. The value of the sequence $C_{ini}$ is given by Equation 3 or Equation 4.

$$c_{init} = \left\lfloor \frac{N_{ID}^{cell}}{30} \right\rfloor \cdot 2^5 + f_{ss}^{PUSCH} \left( \text{or, } c_{init} = \left\lfloor \frac{n_{ID}^{RS}}{30} \right\rfloor \cdot 2^5 + f_{ss}^{PUSCH} \right) \qquad \text{Equation 3}$$

$$f_{ss}^{PUSCH} = ((N_{ID}^{cell} + \Delta_{ss}) \bmod 30), \Delta_{ss} \in \{0, 1, \ldots, 29\}$$

$$c_{init} = \left\lfloor \frac{N_{ID}^{csh\_DMRS}}{30} \right\rfloor \cdot 2^5 + \left( N_{ID}^{csh\_DMRS} \bmod 30 \right) \qquad \text{Equation 4}$$

In Equation 1, the value of u is determined by the following equation.

$$u = (f_{gh}(n_s) + f_{ss}) \bmod 30 \qquad \text{Equation 5}$$

$$f_{gh}(n_s) = \qquad \text{Equation 6}$$

$$\begin{cases} 0 & \text{if group hopping is disabled} \\ \left( \sum_{i=0}^{7} c(8n_s + i) \cdot 2^i \right) \bmod 30 & \text{if group hopping is enabled} \end{cases}$$

Herein, $c_{init}$ for c(i) is determined by Equation 7 below.

$$c_{init} = \left\lfloor \frac{n_{ID}^{RS}}{30} \right\rfloor \qquad \text{Equation 7}$$

The scrambling sequence of the legacy LTE PUSCH is determined by the following equation.

$$c_{init}=n_{RNTI}\cdot2^{14}+q\cdot2^{13}+\lfloor n_s/2\rfloor\cdot2^9+N_{ID}^{cell} \quad \text{Equation 8}$$

(For details and parameters which are not mentioned above in relation to equations given above, refer to 3GPP TS 36.211 V12.1.0 (2014-03).)

In Equation 3, $f_{ss}^{PUSCH}$, a sequence shift pattern related to the initial value of a sequence constituting the DMRS, may indicate the number of antenna ports. For example, if the number of antenna ports is greater than or equal to 2, $f_{ss}^{PUSCH}$ may be set to 0.

Alternatively, if the number of antenna ports is greater than or equal to 2, an additional offset X may be applied ($f_{ss}^{PUSCH}=((N_{ID}^{cell}+\Delta_{ss}+X)\bmod 30)$). That is, an offset corresponding to a predetermined value X may be added to the sequence shift pattern. Alternatively, numbers of antenna ports may be mapped to the respective offset values. A device having received a discovery signal may attempt to blind-decode the CS. If the CS is shifted by X, it may be assumed that the number of antenna ports (or the number of antenna ports mapped to X) is greater than or equal to 2.

$n_{ID}^{RS}$ (or $N_{ID}^{cell}$), which is a parameter related to the cell ID, may be a virtual cell ID. This parameter is intended to allow the DMRS of a D2D discovery signal to support inter-cell discovery. The virtual cell ID may be assigned the same value in one cluster. Alternatively, the virtual cell ID may be assigned the same value for all devices of a cell. The parameter related to the cell ID may be set to a value which is different from values (0 to 503) which are usable as the physical cell ID values (0 to 509) which are usable as the virtual cell ID. That is, the value of the parameter may be selected from a range different from a range of the physical cell ID or a range of the virtual cell ID. For example, 510 may be used for configuration of the DMRS of the D2D discovery signal and the scrambling sequence among the values outside the virtual cell ID range. By intentionally setting the parameter related to the cell ID to values outside the range of the physical cell ID or the virtual cell ID, D2D signal reception apparatuses may ensure pseudo-orthogonality with the legacy PUSCH. (For a (in-network and/or out-of-network) D2D device, the value of the parameter may be predetermined as one value which is outside the cell ID range, may be randomly selected from a set having a limited number of values outside the cell ID range, or may be a specific value set by the network). In addition, the "in-network" device and the "out-of-network" device may set the parameter related to the cell ID using different methods. For example, even if the "out-of-network" UE and the in-network UE use a DMRS base sequence outside the cell ID range, they may be preconfigured to use different values as the sequence. Alternatively, the parameter may be set to a value which is outside the cell ID range and signaled by the cluster head or synchronization head through a physical layer signal or a higher layer signal. This is intended to ensure pseudo-orthogonality of the DMRS and the scrambling sequence with a neighboring in-network D2D device. While the in network device may use a value set by the network, the out-of-network UE may use a preset value among values outside the cell ID range or use a value randomly selected from a preconfigured limited set of values outside the cell ID range. Alternatively, the default value of the parameter related to the cell ID may be fixed to a value which is within the existing cell ID range or be selected from a set consisting of values which are not within the cell ID range. In this case, the network may set one value in a region including the range of the cell ID, when necessary (e.g., in order to ensure orthogonality with the PUSCH DM RS of a specific cell)).

The virtual cell ID may be delivered to a device through higher layer signaling or have a preset value (for, for example, a device in the RRC Idle state). Alternatively, the virtual cell ID may have a value transmitted by a specific device such as the cluster head or the synchronization head. In this case, the value may be signaled to devices belonging to the same cluster.

In the description above, the CS initial value parameter may be provided separately from the cell ID. In addition, the seed value (e.g., $N_{ID}^{csh\_DMRS}$ or $N_{ID}^{cell}$) used in performing sequence hopping may be predetermined, signaled through RRC, or directly delivered through a physical layer control signal. Similar to the initial value set in configuring the DMRS sequence and the scrambling sequence, the value of the cell ID used in setting the initial value of CS may be intentionally set to a value outside the physical cell ID range or virtual cell ID range. For example, 510 may be used in setting the CS initial value. In this case, an eNB may directly signal a physical layer control signal to the D2D device, and the value may be directly indicated between D2D devices over a D2D control channel between the devices.

$N_{ID}^{cell}$ complies with the proposed method in order to configure a D2D scrambling sequence. In Equation 8, $n_{RNTI}$, q, and $n_s$ need to be set to perform D2D signal transmission. D2D signal reception apparatuses may be in the RRC idle state. In this case, it is difficult for the eNB to signal $n_{RNTI}$ and q and thus $n_{RNTI}$ and q are preferably preset to specific values. For example, $n_{RNTI}$ and q may be set to specific values or 0. $n_s$, which denotes a slot index, may be set to a slot index of a resource on which a D2D signal is transmitted.

For information which needs to be directly received without a specific channel between D2D devices, the same DMRS sequence/CS configuration/scrambling sequence may be configured. For example, a control channel for D2D communication needs to be decoded by all UEs before a D2D communication data packet is received. This is similar to the operation of receiving the D2D discovery signal. In order for all UEs to receive the D2D signal, the DMRS sequence/CS configuration/scrambling sequence configuration methods need to be preconfigured, and an ID which is not used for the existing cell ID is preferably generated in order to ensure coexistence with the legacy PUSCH. Accordingly, the DMRS sequence/CS configuration/scrambling sequence configuration of the control channel for D2D communication may be preset to one (e.g., 510 or 511) of ID values outside the range of the cell ID.

As a method for signaling the number of antenna ports, a predetermined resource region associated with the discovery signal may be used. The number of antenna ports may be indicated by a bit sequence transmitted through the predetermined resource region. More specifically, either a repeated code for indicating the number of antennas or the number of antennas may be spread with a specific bit sequence and then transmitted through the predetermined resource region. In this case, the first device may assume that a field for indicating the number of antenna ports is (always) transmitted using Single Input Single Output (SISO).

Specifically, for example, the number of antenna ports may be indicated by 5 bits mapped to a predetermined resource region as shown in Table 1 below.

TABLE 1

| # of antenna port | Antenna port configuration bit |
|---|---|
| 1 | 00000 |
| 2 | 10101 |
| 4 | 11111 |

Figure 6:
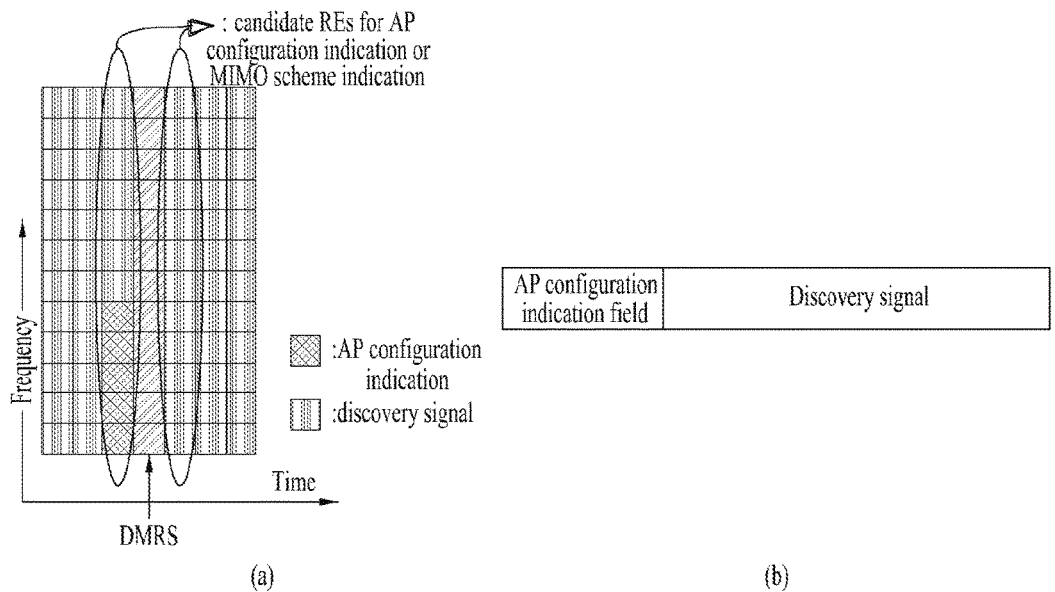
FIGS. 6 and 7 illustrate a method for transferring the-number-of-antennas information according to an embodiment of the present invention.

That is, the 5 bits may be mapped to 5 REs using on/off keying. A specific example of mapping is illustrated in FIG. 6(a). Referring to FIG. 6(a), the predetermined resource region is arranged adjacent to a resource region in which a DMRS associated with the discovery signal is transmitted. This is intended to maximize channel estimation performance. The first device may recognize the number of antenna ports by decoding an RE at a predetermined position, and then decode the discovery signal using the recognized number, as illustrated in the figure. FIG. 6(b) illustrates discovery-related fields constituted by an antenna port configuration indication field and a discovery signal in the logic domain, wherein the discovery-related fields are intended for mapping in the same physical domain as illustrated in FIG. 6(a).

As another method, if the eNB directly indicates a transmission resource for the discovery signal to a specific device (type 2 discovery), the eNB may also signal the number of antenna ports to the transmission and reception apparatuses. According to an embodiment, CRC masking is applied to the number of antenna ports to be used for the uplink grant DCI, and then the number of antenna ports is transmitted. If a discovery signal reception apparatus receives the uplink grant DCI, the applied mask is predefined to be the number of antenna ports used by a D2D discovery signal transmission apparatus.

Figure 7:
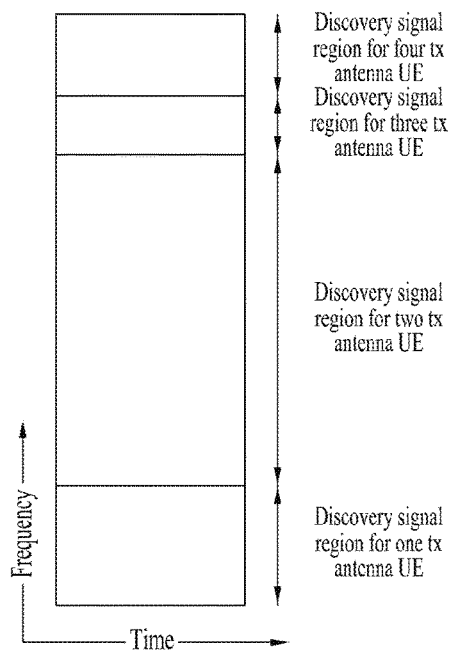

In another example, since the eNB (or cluster head) is capable of recognizing the number of antenna ports that devices within the eNB (or cluster members) have, the eNB may group devices having the same number of antenna ports into one group may instruct the devices having the number of antenna ports to transmit discovery signals in a specific time or frequency resource region. Herein, the eNB may pre-signal, to D2D devices, the resource region in which the devices having the number of antenna ports transmit discovery signals, through a physical layer or higher layer signal. In the specific time/frequency resource region, the discovery signal reception apparatuses may assume that the devices have the number of antenna ports and perform decoding on the assumption of a preconfigured transmission method for the antenna ports. For example, the frequency domain may be divided in association with the number of antenna ports, and the devices and having a specific number of antenna ports may transmit discovery signals in the respective divided regions, as shown in FIG. 7. That is, the first device may determine the number of antenna ports through the frequency regions in which discovery signals are transmitted.

Bundling in the Case of Beam Cycling

Hereinafter, a description will be given of PRB bundling according to an embodiment of the present invention.

If PRB bundling is applied to signal transmission in transmission mode 9 or 10, the signal reception apparatuses may perform interpolation/combining operations in the resource region to which PRB bundling is applied. Reporting a precoding matrix indicator (PMI)/rank indicator (RI) is not performed in transmitting a discovery signal. Accordingly, if a discovery signal transmission side transmits a discovery signal by applying beam cycling (a method to obtain diversity by changing a beam randomly or in a predetermined pattern in the time or frequency domain), a resource unit for which precoding may be assumed needs to be preconfigured or signaled. The reception apparatus hardly performs demodulation on the assumption of several bundlings at the same time, and information for an incorrect resource unit results in incorrect estimation.

The PRB bundling granularity which may be configured in the time domain, the frequency domain or the time-frequency domain may be preconfigured or pre-signaled to a device or a D2D reception apparatus by the eNB or a D2D transmission apparatus through physical layer/higher layer signaling.

The bundling granularity may be determined such that the bundling granularity is specific to/dependent on the system bandwidth, a discovery signal transmission region configured by the network, or a discovery resource set.

Figure 8:
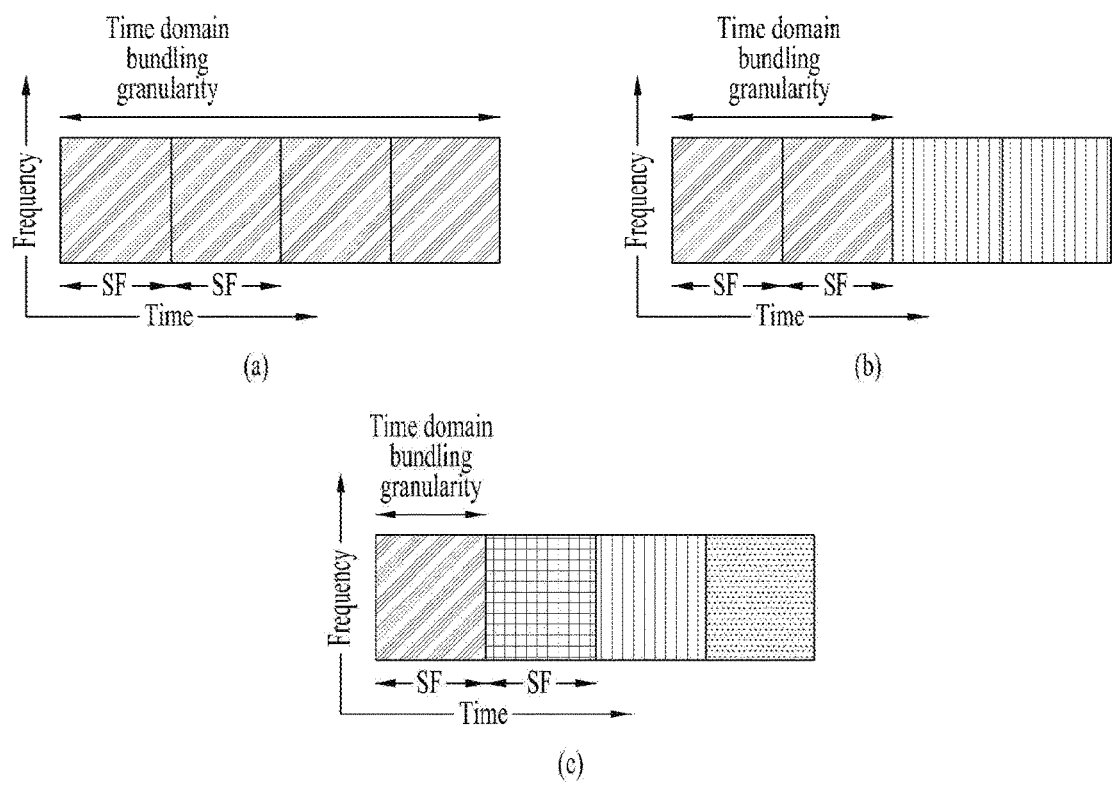
FIGS. 8 and 9 illustrate bundling according to an embodiment of the present invention.

In the time domain, the bundling granularity may be n OFDM symbols, n slots (half the slots in the case of the short block structure) or n subframes (n being an integer). For example, if TTI bundling is used in D2D, and the respective TTIs are consecutive for transmission, devices having two or more antenna ports (e.g., the first device described above) may assume that different precoding has been used every n subframes (i.e., the same precluding has been used in n subframes). FIG. 8 illustrates an example of bundling granularity in the time domain that is employed when TTI bundling is used in D2D. In FIG. 8(a), the bundling granularity is 4 subframes (SFs). In FIG. 8(b), the bundling granularity is 2 SFs. In FIG. 8(c), the bundling granularity is 1 SF. If the bundling granularity is configured along with frequency hopping, channel estimation through integration in the bundling granularity may significantly degrade channel estimation performance. Accordingly, bundling and frequency hopping may not be configured simultaneously, and the reception apparatus may perform decoding on the assumption that bundling and frequency hopping are not configured simultaneously. If TTI bundling and frequency hopping are simultaneously configured for D2D, the apparatus may perform decoding, considering/assuming that the bundling granularity is constantly set to a specific value (e.g., 1 SF). If TTI bundling is configured for D2D, but corresponding subframes are not consecutive, bundling may be performed only among consecutive subframes. In this case, TTI bundling may be configured and the PRB bundling granularity may be configured for every set of consecutive subframes through separate signaling, or an implicit reception apparatus may perform PRB bundling only in consecutive subframes. If the bundling granularity is greater than the length of consecutive subframes among subframes assigned to a D2D pair, the reception apparatus may perform PRB bundling only in the consecutive subframes. In this case, if frequency hopping is configured together with bundling, the bundling granularity may be fixed to 1 SF (or 1 slot) (if frequency hopping is configured, the PRB bundling granularity of the D2D reception apparatus is operatively connected with the frequency hopping unit).

Figure 9:
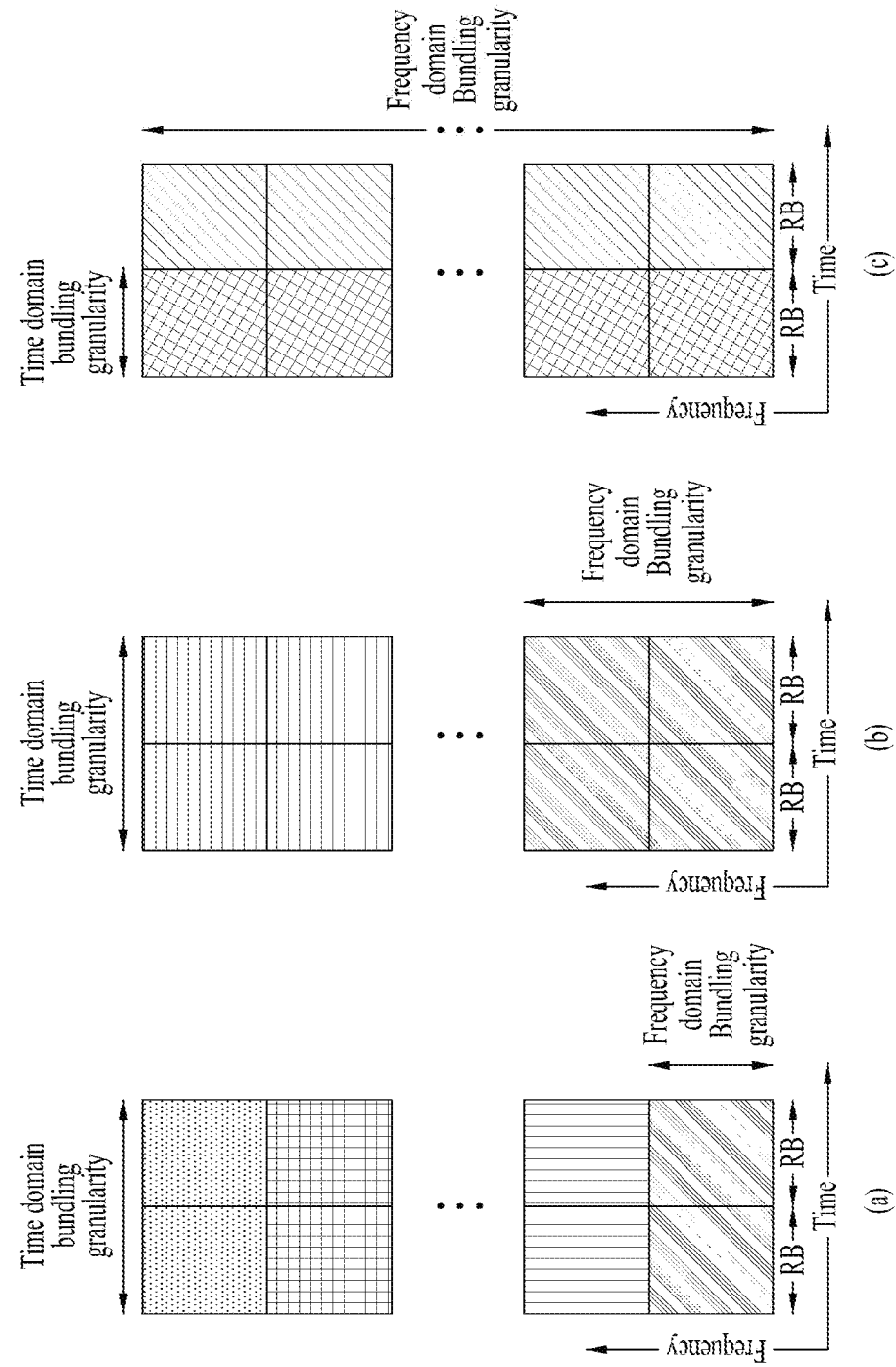

In the frequency domain, the bundling granularity may be n RBs. FIG. 9 illustrates exemplary bundling granularities for a discovery signal in a few frequency regions. In FIG. 9(a), the granularity corresponds to 2 slots in the time domain and 1 RB in the frequency domain. In FIG. 9(b), the granularity corresponds to 2 slots in the time domain and 2 RBs (1 subframe) in the frequency domain (1 subframe). In FIG. 9(c), the granularity corresponds to 1 slot in the time domain and the whole (system) bandwidth in the frequency domain. For example, for the bundling granularity of FIG.

9(b), an apparatus having two or more antenna ports may be preconfigured to perform precoder cycling, and the same precoding may be assumed in the corresponding bundling granularity.

The frequency hopping and beam cycling are applied together to transmission of a discovery signal, the unit of frequency hopping and the bundling granularity in which beam cycling is performed may be configured in the following four ways: i) both beam cycling and frequency hopping may be periodically performed in units of slots; ii) beam cycling may be periodically performed in units of slots, and frequency hopping may be periodically performed in units of subframes; iii) beam cycling may be periodically performed in units of subframes, and frequency hopping may be periodically performed in units of slots; iv) both beam cycling and frequency hopping may be periodically performed in units of subframes.

In cases i) and iv), it is difficult to obtain an additional diversity even if beam cycling is applied because the channel has already changed in the frequency domain. In cases ii) and iii), additional diversity may be obtained according to beam cycling or hopping since the beam has changed or the channel has been changed by hopping in a subframe. In these cases, the D2D reception apparatus cannot perform interpolation in performing channel estimation between two slots. For the discovery signal, all apparatuses may be preconfigured to perform frequency hopping. In this case, apparatuses having multiple Tx antennas may additionally perform beam cycling. In this case, to obtain an additional gain through beam cycling, a time-domain bundling granularity smaller than the frequency hopping time unit may be configured.

D2D Communication

Hereinafter, D2D communication according to an embodiment of the present invention will be discussed. Once the first device recognizes the number of antenna ports using the method described above, the number of antenna ports used for discovery may be used for communication control (or, a control signal delivered between D2D devices) to apply SFBC, antenna selection or precoder cycling. In transmitting data except the control signal, a plurality of antenna ports may be used to signal, through D2D control (signals), whether to apply SFBC, whether to perform antenna selection, whether to perform precoder cycling, and whether to perform spatial multiplexing.

If it is not possible to pre-recognize the number of antenna ports, a single antenna port technique may be used in the control region of communication. In this case, the number of antenna ports to be used for D2D communication may be masked on CRC of the control signal. In addition, the MIMO transmission technique (e.g., beam cycling, SFBC) to be used for communication may be involved in CRC masking.

Alternatively, if the number of antenna ports used in the control region of communication may be subjected to CRC masking, and the reception apparatus performs blind-decoding for all antennas in decoding a control signal, the control region may also be transmitted using the multi-antenna technique. In this case, whether the transmission technique for the control region is beam cycling, SFBC or antenna selection needs to be predetermined. Alternatively, the MIMO transmission technique may also be involved in CRC masking, and thus decoding of the control signal may be attempted in all cases. In transmitting data, a technique signaled in the control region may be used to perform multi-antenna transmission. For example, the MIMO technique to be used for communication may be single layer transmission, but beam cycling may be applied in units of slots or RBs. In this case, whether RB bundling is possible and/or the bundling granularity may be delivered through a control signal.

As another example, if D2D data is transmitted on a plurality of PRBs, a region in which the D2D reception apparatus can assume the same precoding needs to be determined. The bundling granularity for D2D communication may be the same as or different from the PRB bundling granularity for transmission of a discovery signal. For example, if multiple discovery signals are multiplexed in the frequency domain, one discovery signal may occupy only a small number of RBs. In this case, the discovery signal may perform beam cycling only in the time domain (e.g., in units of slots). However, for D2D communication using the full band, beam cycling may be performed in the frequency domain. Accordingly, the PRB bundling granularity for D2D communication may be configured to be different from the bundling granularity for discovery. In D2D communication, the PRB bundling granularity may be predetermined, and may be configured to be dependent on the system bandwidth only when PMI/RI is reported.

The method for signaling a DMRS sequence described above is effective for a single antenna port apparatus, and may also be used to signal a DMRS sequence between normal D2D devices. That is, while the DMRS base sequence and sequence hopping are determined based on cell ID, a seed value (e.g., $N_{ID}^{csh\_DMRS}$ or $N_{ID}^{cell}$) operating as a seed for the determination may be predetermined or delivered through RRC signaling or a physical layer control signal. Herein, the physical layer control signal may be directly signaled to the D2D device by the eNB, or the value may be directly indicated between D2D devices over a D2D control channel between devices. For example, $n_{ID}^{RS}$ (or $N_{ID}^{cell}$) used in initializing configuration of a DMRS base sequence, determination of a sequence hopping method, CS determination and configuration of a scrambling sequence may be directly signaled from the D2D transmission UE to the D2D reception UE over a control channel between the D2D devices.

The DMRS sequence may be used in common for a specific group of devices (the same cyclic shift pattern may also be used for the devices). This is, scheduling needs to be performed so as not to cause collision in allocating resources. In order to prevent completely identical reference signals from being used even if collision occurs, the cyclic shift (CS) value or CS pattern of the DMRS may differ among the devices. The CS may be signaled between the D2D devices through a direct control signal, or may be signaled by an eNB, a cluster head or a synchronization reference apparatus.

Figure 10:
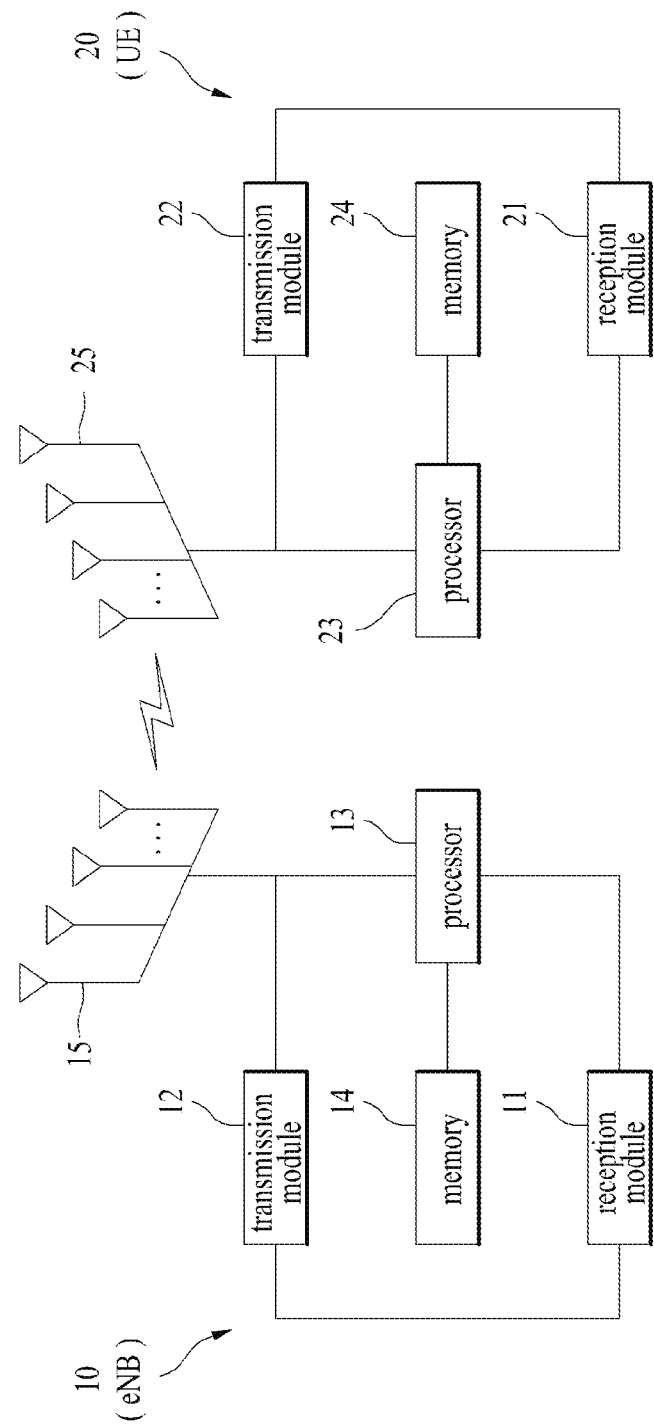
FIG. 10 illustrates configuration of transmission and reception apparatuses.

Configuration of Apparatuses According to an Embodiment of the Present Invention FIG. 10 is a diagram illustrating the construction of a transmission point apparatus and a UE apparatus according to an embodiment of the present invention.

Referring to FIG. 10, a transmission point apparatus 10 according to the present invention may include a reception (Rx) module 11, a transmission (Tx) module 12, a processor 13, a memory 14, and a plurality of antennas 15. The plurality of antennas 15 indicates a transmission point apparatus for supporting MIMO transmission and reception. The Rx module 11 may receive a variety of signals, data, and information on UL from the UE. The Tx module 12 may transmit a variety of signals, data, and information on DL to the UE. The processor 13 may control overall operation of the transmission point apparatus 10.

The processor 13 of the transmission point apparatus 10 according to one embodiment of the present invention may operate to perform the above-mentioned embodiments.

The processor 13 of the transmission point apparatus 10 processes information received at the transmission point apparatus 10 and transmission information to be externally transmitted. The memory 14 may store the processed information for a predetermined time. The memory 14 may be replaced with a component such as a buffer (not shown).

Referring to FIG. 10, a UE apparatus 20 may include an Rx module 21, a Tx module 22, a processor 23, a memory 24, and a plurality of antennas 25. The plurality of antennas 25 indicates a UE apparatus supporting MIMO transmission and reception. The Rx module 21 may receive downlink signals, data, and information from the eNB. The Tx module 22 may transmit UL signals, data, and information to the eNB. The processor 23 may control overall operation of the UE apparatus 20.

The processor 23 of the UE apparatus 20 according to one embodiment of the present invention can operate to perform the above-mentioned embodiments.

The processor 23 of the UE apparatus 20 processes information received at the UE apparatus 20 and transmission information to be externally transmitted. The memory 24 may store the processed information for a predetermined time. The memory 24 may be replaced with a component such as a buffer (not shown).

The specific configurations of the transmission point apparatus and the UE apparatus may be implemented such that the various embodiments of the present invention are independently performed or two or more embodiments of the present invention are simultaneously performed. Redundant matters will not be described herein for clarity.

The description of the transmission point apparatus 10 shown in FIG. 10 may be identically applied to a relay node acting as a DL transmission entity or UL reception entity and the description of the UE apparatus 20 may be identically applied to the relay node acting as a DL reception entity or a UL transmission entity.

The above-described embodiments may be implemented by various means, for example, by hardware, firmware, software, or a combination thereof In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the exemplary embodiments of the present invention is given to enable those skilled in the art to realize and implement the present invention. While the present invention has been described referring to the exemplary embodiments of the present invention, those skilled in the art will appreciate that many modifications and changes can be made to the present invention without departing from the scope of the present invention. For example, the constructions of the above-described embodiments of the present invention may be used in combination. Therefore, the present invention is not intended to be limited to the embodiments disclosed herein but is to give a broadest range matching the principles and new features disclosed herein.

The present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be within the scope of the invention. The present invention is not intended to limit the embodiments disclosed herein but is to give a broadest range matching the principles and new features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The above-described embodiments of the present invention are applicable to various mobile communication systems.

What is claimed is:

1. A method for transmitting and receiving a device-to-device (D2D) signal by a first device in a wireless communication system, the method comprising: receiving a discovery signal from a second device having plural antenna ports; determining a number of the plural antenna ports used by the second device for transmission of the discovery signal, the number of the plural antenna ports being determined based on a sequence shift pattern, wherein the sequence shift pattern is equal to an initial value of a Demodulation Reference Signal (DMRS) for the discovery signal minus a constant that is based on a reference signal ID; and decoding the discovery signal based on the determined number of the plural antenna ports, wherein the sequence shift pattern is determined by a combination of a cell ID and one of a set of predetermined constants, wherein the sequence shift pattern is $f_{ss}^{PUSCH}=((N_{ID}^{cell}+\Delta_{ss}) \bmod 30)$, wherein the initial value of DMRS is one of $$c_{init} = \left\lfloor \frac{N_{ID}^{cell}}{30} \right\rfloor \cdot 2^5 + f_{ss}^{PUSCH} \text{ and } c_{init} = \left\lfloor \frac{n_{ID}^{RS}}{30} \right\rfloor \cdot 2^5 + f_{ss}^{PUSCH},$$

$$\Delta_{ss} \in \{0, 1, \ldots 29\},$$

the constant is one of $$\left\lfloor \frac{N_{ID}^{cell}}{30} \right\rfloor \cdot 2^5 \text{ and } \left\lfloor \frac{n_{ID}^{HS}}{30} \right\rfloor \cdot 2^5,$$

wherein the first device assumes that a same precodinq is used in a unit of a preset number of subframes in receiving the discovery signal, and
wherein the first device assumes that frequency hopping is not applied to transmission of the discovery signal, or when frequency hopping is applied to transmission of the discovery signal, the first device assumes that the preset number is 1.

2. The method according to claim 1, wherein the cell ID has a same value in one cluster of base stations.

3. The method according to claim 1, wherein the sequence shift pattern is set to 0.

4. The method according to claim 1, wherein an offset of a preset value is added to the sequence shift pattern.

5. A first device for performing device-to-device (D2D) communication in a wireless communication system, the first device comprising: a reception module; and
 a processor, wherein the processor is configured to:
  receive a discovery signal from a second device having plural antenna ports, determine a number of the plural antenna ports used by the second device for transmission of the discovery signal, the number of the plural antenna ports being determined based on a sequence shift pattern,
 wherein the sequence shift pattern is equal to an initial value of a Demodulation Reference Signal (DMRS) for the discovery signal minus a constant that is based on a reference signal ID; and
 decode the discovery signal based on the determined number of the plural antenna ports,
 wherein the sequence shift pattern is determined by a combination of a cell ID and one of a set of predetermined constants, wherein the sequence shift pattern is $f_{ss}^{PUSCH} = ((N_{ID}^{cell} + \Delta_{ss}) \bmod 30)$, wherein the initial value of DMRS is one of $$c_{init} = \left\lfloor \frac{N_{ID}^{cell}}{30} \right\rfloor \cdot 2^5 + f_{ss}^{PUSCH} \text{ and } c_{init} = \left\lfloor \frac{n_{ID}^{RS}}{30} \right\rfloor \cdot 2^5 + f_{ss}^{PUSCH},$$

$$\Delta_{ss} \in \{0, 1, \ldots 29\},$$

the constant is one of $$\left\lfloor \frac{N_{ID}^{cell}}{30} \right\rfloor \cdot 2^5 \text{ and } \left\lfloor \frac{n_{ID}^{HS}}{30} \right\rfloor \cdot 2^5,$$

wherein the first device assumes that a same precodinq is used in a unit of a preset number of subframes in receiving the discovery signal, and wherein the first device assumes that frequency hopping is not applied to transmission of the discovery signal, or when frequency hopping is applied to transmission of the discovery signal, the first device assumes that the preset number is 1.

* * * * *